US011294732B2

(12) United States Patent
Cheng et al.

(10) Patent No.: US 11,294,732 B2
(45) Date of Patent: Apr. 5, 2022

(54) SELF-PARTITIONING DISTRIBUTED COMPUTING SYSTEM

(71) Applicant: Microsoft Technology Licensing, LLC, Redmond, WA (US)

(72) Inventors: Dongyang Cheng, Sammamish, WA (US); Heng Wang, San Mateo, CA (US); Daulet Zhanguzin, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 321 days.

(21) Appl. No.: 16/566,512

(22) Filed: Sep. 10, 2019

(65) Prior Publication Data

US 2021/0073046 A1 Mar. 11, 2021

(51) Int. Cl.

*G06F 9/455* (2018.01)
*G06F 9/50* (2006.01)

(Continued)

(52) U.S. Cl.

CPC ........ *G06F 9/5083* (2013.01); *G06F 9/45558* (2013.01); *G06F 16/2379* (2019.01);

(Continued)

(58) Field of Classification Search

None

See application file for complete search history.

(56) References Cited

U.S. PATENT DOCUMENTS

| | | | |
|---|---|---|---|
| 8,392,920 | B2 | 3/2013 | Ostrovsky et al. |
| 8,495,206 | B2 | 7/2013 | Borghetti et al. |

(Continued)

FOREIGN PATENT DOCUMENTS

| | | | |
|---|---|---|---|
| CN | 106844018 | A | 6/2017 |
| CN | 109086138 | A | 12/2018 |
| WO | 2013140412 | A1 | 9/2013 |

OTHER PUBLICATIONS

Surbhi et al., "Performance Evaluation of Load Balancing Algorithms in Hadoop", 2018, IEEE, pp. 491-496. (Year: 2018).*

(Continued)

*Primary Examiner* — Kenneth Tang

(74) *Attorney, Agent, or Firm* — Michael Best & Friedrich LLP

(57) ABSTRACT

Methods and systems of self-partitioning entities. One system includes an electronic processor configured to access the updated job distribution information. The electronic processor is also configured to query a second predetermined number of entities included within a first secondary partition of the one or more secondary partitions. The electronic processor is also configured to determine whether the first secondary partition includes a second set of remaining entities in addition to the second predetermined number of entities. In response to the first secondary partition including a second set of remaining entities, the electronic processor is also configured to divide the second set of remaining entities of the first secondary partition into a third partition, where the third partition has a third partition range smaller than the second partition range, and generate and transmit, to the central queue server, additional updated job distribution information identifying the third partition.

19 Claims, 5 Drawing Sheets

100

CENTRAL QUEUE SERVER 110

JOB DISTRIBUTION INFORMATION 235

SCHEDULING DEVICE 115

HUMAN-MACHINE INTERFACE 230

NETWORK 125

HOST SERVER 105

VIRTUAL MACHINES 320

STORAGE DEVICE 120

ENTITIES 225

(51) Int. Cl.
*G06F 16/23* (2019.01)
*G06F 16/245* (2019.01)

(52) U.S. Cl.
CPC .... *G06F 16/245* (2019.01); *G06F 2009/4557* (2013.01); *G06F 2009/45595* (2013.01)

(56) References Cited

U.S. PATENT DOCUMENTS

| | | | | |
|---|---|---|---|---|
| 8,645,745 | B2 | 2/2014 | Bareness et al. | |
| 8,661,129 | B2 | 2/2014 | Gnanasambandam et al. | |
| 9,442,954 | B2 | 9/2016 | Guha et al. | |
| 2005/0132380 | A1 | 6/2005 | Chow | |
| 2005/0177553 | A1* | 8/2005 | Berger | G06F 16/283 |
| 2008/0030764 | A1* | 2/2008 | Zhu | G06F 9/5038 358/1.15 |
| 2011/0225165 | A1* | 9/2011 | Burstein | G06F 16/2272 707/741 |
| 2013/0204990 | A1 | 8/2013 | Skjolsvold et al. | |
| 2015/0026698 | A1 | 1/2015 | Malakhov et al. | |
| 2015/0319230 | A1* | 11/2015 | Skjolsvold | G06F 9/5077 709/224 |
| 2017/0177601 | A1 | 6/2017 | Borate et al. | |
| 2020/0125666 | A1* | 4/2020 | Eadon | G06F 16/278 |

OTHER PUBLICATIONS

Badonnel, et al., “Dynamic Pull-Based Load Balancing for Autonomic Servers”, In Proceedings of IEEE Network Dperations and Management Symposium, Apr. 7, 2008, pp. 751-754.

“International Search Report and Written Opinion Issued in PCT Application No. PCT/US20/038280”, dated Oct. 15, 2020, 15 Pages.

“Understanding the Hadoop MapReduce Framework”, Retrieved from https://www.thegeekdiary.com/understanding-the-hadoop-mapreduce-framework/, Retrieved on Jul. 25, 2019, 6 Pages.

Ali, et al., “Optimal Task Partitioning model in Distributed Heterogeneous Parallel Privileged and Confidential Computing Environment”, In International Journal of Advanced Information Technology, vol. 2, Issue 6, Dec. 1, 2012, pp. 13-24.

* cited by examiner

100

CENTRAL QUEUE SERVER
110
JOB DISTRIBUTION INFORMATION
235
SCHEDULING DEVICE
115
HUMAN-MACHINE INTERFACE
230
NETWORK
125
HOST SERVER
105
VIRTUAL MACHINES
320
STORAGE DEVICE
120
ENTITIES
225

SELF-PARTITIONING DISTRIBUTED COMPUTING SYSTEM

FIELD

Embodiments described herein relate to self-partitioning, and more particularly, to self-partitioning within a distributed computing system.

SUMMARY

A virtual machine may be used to process data in response to a job request. A job request may include, for example, deploying a software update or a fix to address an error, resetting an activation status, checking data, or the like. However, when the job request is associated with a large amount of data (for example, entities stored in table storage), the virtual machine may process a subset of the associated entities. The remaining entities associated with the job request may be randomly divided into one or more additional subsets and assigned to other virtual machines for processing.

However, when the remaining entities are randomly divided into one or more additional subsets, an amount of work for each virtual machine may vary. For example, a first virtual machine may finish processing a first subset of entities before a second virtual machine finishes processing a second subset of entities. Therefore, while the second virtual machine continues processing the second subset of entities, the first virtual machine may sit idle. In other words, randomly dividing the remaining entities into subsets may result in an uneven distribution of work across the virtual machines. An uneven distribution of work may increase a processing time of a job request (for example, how long it takes to complete a job request). Additionally, computing resources (for example, the virtual machines) may not be efficiently utilized when work is not evenly distributed.

To address these and other problems, embodiments described herein provide methods and systems for self-partitioning entities (or data) such that work (e.g., processing of the data) is evenly distributed across virtual machines. The embodiments described herein, among other things, improve and optimize the utilization of computing resources. For example, by evenly distributing work across virtual machines, computing resources are more evenly balanced and, ultimately, are more fully and efficiently utilized. By utilizing the computing resources more fully, job requests may be processed more quickly. In other words, by evenly distributing work across virtual machines embodiments described herein may process stored data as fast as permitted by the computing resources available. Additionally, the embodiments described herein provide for virtual machines that perform job processing and job distribution functionality as opposed to a centralized process for dividing work among virtual machines that may result in bottlenecks and slowness.

Accordingly, embodiments described herein provide systems and methods of self-partitioning. One embodiment provides a system of self-partitioning entities. The system includes an electronic processor configured to access the updated job distribution information. The electronic processor is also configured to query a second predetermined number of entities included within a first secondary partition of the one or more secondary partitions. The electronic processor is also configured to determine whether the first secondary partition includes a second set of remaining entities in addition to the second predetermined number of entities. In response to the first secondary partition including a second set of remaining entities, the electronic processor is also configured to divide the second set of remaining entities of the first secondary partition into a third partition, where the third partition has a third partition range smaller than the second partition range, and generate and transmit, to the central queue server, additional updated job distribution information identifying the third partition.

Another embodiment provides a method of self-partitioning entities. The method includes accessing, with an electronic processor, from a central queue server, job distribution information associated with a plurality of entities, the job distribution information identifying a first partition of the plurality of entities. The first partition has a first partition range. The method also includes querying, with the electronic processor, a first predetermine number of entities included within the first partition. The method also includes determining, with the electronic processor, whether the first partition includes a set of remaining entities in addition to the first predetermined number of entities. The method also includes, in response to the first partition including a set of remaining entities, dividing, with the electronic processor, the set of remaining entities from the first partition into one or more secondary partitions, where each of the one or more secondary partitions has a second partition range smaller than the first partition range, and generating and transmitting, with the electronic processor, to the central queue server, updated job distribution information identifying the one or more secondary partitions.

Yet another embodiment provides a non-transitory, computer-readable medium including instructions that, when executed by an electronic processor, cause the electronic processor to execute a set of functions. The set of functions includes accessing, from a central queue server, job distribution information associated with a plurality of entities, the job distribution information identifying a first partition of the plurality of entities. The first partition has a first partition range. The set of functions also includes querying a first predetermine number of entities included within the first partition. The set of functions also includes determining whether the first partition includes a set of remaining entities in addition to the first predetermined number of entities. The set of functions also includes, in response to the first partition including a set of remaining entities, dividing the set of remaining entities from the first partition into one or more secondary partitions, where each of the one or more secondary partitions has a second partition range smaller than the first partition range, and generating and transmitting, to the central queue server, updated job distribution information identifying the one or more secondary partitions.

DETAILED DESCRIPTION

One or more embodiments are described and illustrated in the following description and accompanying drawings.

These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory, computer readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
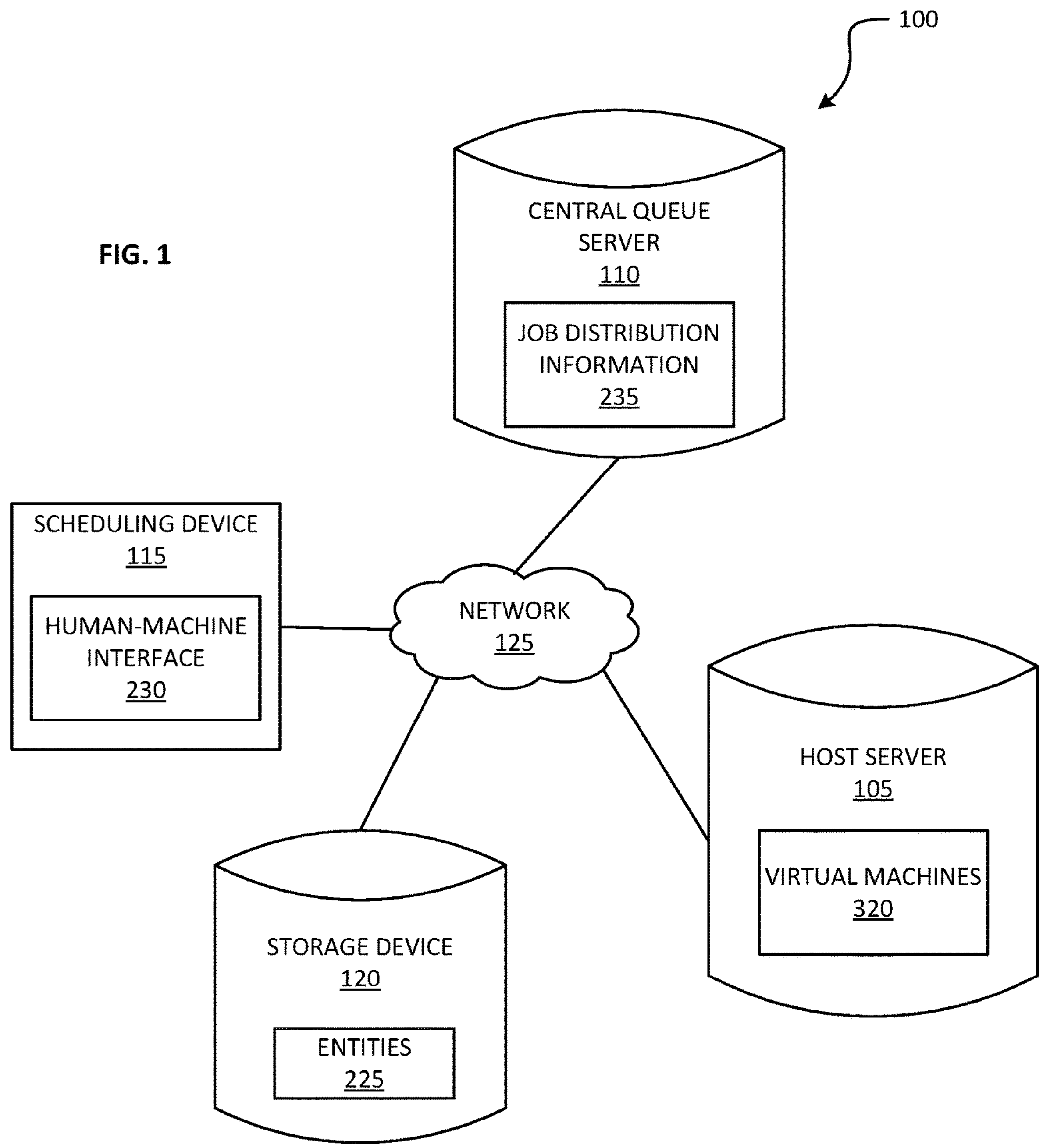
FIG. 1 schematically illustrates a system of self-partitioning according to some embodiments.

FIG. 1 schematically illustrates a system 100 of self-partitioning according to some embodiments. The system 100 includes a host server 105, a central queue server 110, a scheduling device 115, and a storage device 120. In some embodiments, the system 100 includes fewer, additional, or different components than illustrated in FIG. 1. For example, the system 100 may include multiple host servers 105, multiple central queue servers 110, multiple scheduling devices 115, and multiple storage devices 120. Also, in some embodiments, the host server 105, the central queue server 110, the scheduling device 115, the storage device 120, or a combination thereof may be combined into a single device or server. In other embodiments, one or more of the host server 105, the central queue server 110, the scheduling device 115, the storage device 120, or a combination thereof are distributed among multiple devices or servers.

The host server 105, the central queue server 110, the scheduling device 115, and the storage device 120 communicate over one or more wired or wireless communication networks 125. Portions of the communication networks 125 may be implemented using a wide area network, such as the Internet, a local area network, such as Bluetooth® network or Wi-Fi, and combinations or derivatives thereof. It should be understood that in some embodiments, additional communication networks may be used to allow one or more components of the system 100 to communicate. Also, in some embodiments, components of the system 100 may communicate directly as compared to through a communication network 125 and, in some embodiments, the components of the system 100 may communicate through one or more intermediary devices not shown in FIG. 1.

As illustrated in FIG. 1, the storage device 120 stores a plurality of entities 225 (referred to herein collectively as "the entities 225" and individually as "an entity 225"). An entity 225 is a collection of data, such as a set of properties, information, and the like. An entity 225 may include, for example, user data for an application, an address book, device information, and the like. For example, an entity 225 may include client activation data for an application, where the client activation data identifies a machine name and an install state (active or inactive) of the application.

In some embodiments, the storage device 120 provides structured storage of the entities 225 in a form of one or more tables (for example, as part of a table storage service). A table stores data as a collection of entities (for example, the entities 225) similar to a row of data in a spreadsheet or database. A table may store any number of entities (for example, the entities 225), including a very large number of entities 225 (for example, 100,000 or more). A table may be partitioned such that the entities 225 stored within the table are organized by partition. A partition is a consecutive range of entities 225 (for example, a partition range). A partition is generally defined with a lower partition bound and an upper partition bound, where the partition includes the entities 225 within the lower partition bound and the upper partition bound. A partition includes a partition key. The partition key is a unique identifier for the partition within a given table. In other words, the partition key may serve as an index for the entities 225 stored in a given table. The entities 225 stored in a table may be range queried by specifying a partition range represented by an upper partition bound and a lower partition bound. For example, in some embodiments, the entities 225 are stored in an alphabetical order of the partition key. The storage device 120 may be queried for the entities 225 stored within a particular partition. The query may include a partition range with a lower bound as "a" and an upper bound as "b." In response to the query, the storage device 120 may return the entities 225 with a partition key starting with "a," such as "aaa" and "aab," because "aaa" is alphabetically larger than "a" but smaller than "b." The entities 225 may be stored in other orders of the partition key, such as a numerical order.

The scheduling device 115 is a computing device and may include a desktop computer, a terminal, a workstation, a laptop computer, a tablet computer, a smart watch or other wearable, a smart television or whiteboard, or the like. The scheduling device 115 may also include a human-machine interface 230 for interacting with a user. The human-machine interface 230 may include one or more input devices, one or more output devices, or a combination thereof. Accordingly, in some embodiments, the human-machine interface 230 allows a user to interact with the entities 225. For example, the human-machine interface 230 may include a keyboard, a cursor-control device (for example, a mouse), a touch screen, a scroll ball, a mechanical button, a display device (for example, a liquid crystal display ("LCD")), a printer, a speaker, a microphone, or a combination thereof. In some embodiments, the human-machine interface 230 provides a user interface, such as a command-line user interface, to a user. The user may initiate a job request associated with the entities 225 through the user interface. A job request may include, for example, deploying a software update or a fix to address an error, resetting an activation status, processing data, and the like. For example, a user may initiate a job request to perform (or deploy) a software update to fix an error associated with one or more entities 225. In other words, the scheduling device 115 may be used by a user to initiate a processing job associated with the entities 225. In some embodiments, the scheduling device 115 transmits the job request to the central queue server 110 through the network 125.

The central queue server 110 may function as a job distributor or a shared storage for received job requests, including information relating to the job requests (for example, job distribution information). As illustrated in FIG. 1, the central queue server 110 stores job distribution information 235 (for example, in a job queue). The job distribution information 235 may relate to the job request received from the scheduling device 115. For example, the job distribution information 235 may specify a task to be performed for the entities 225 associated with the job request, a partition range associated with the job request, a partition key associated with the job request, and the like. As described in greater detail below, the central queue server 110 is accessible by one or more virtual machines.

Figure 2:
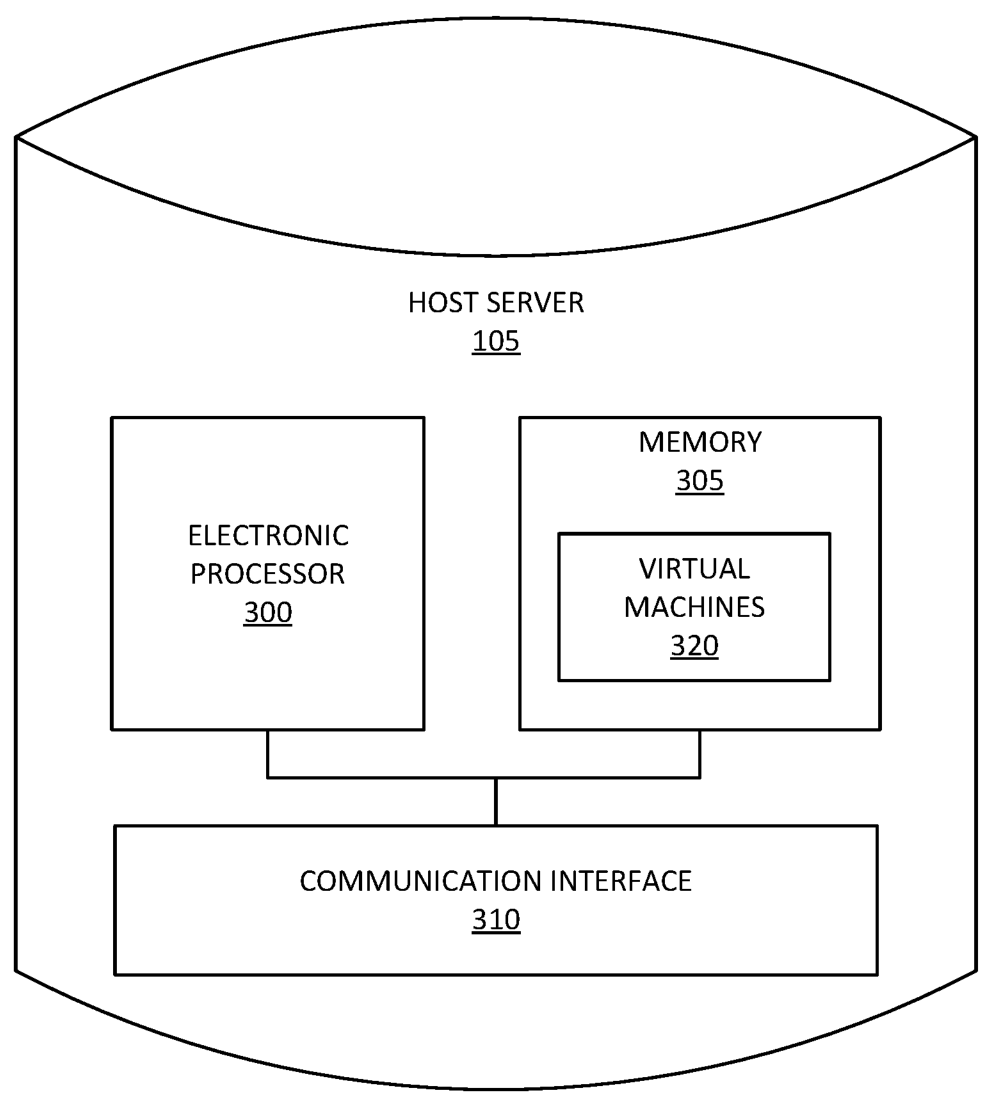
FIG. 2 schematically illustrates a host server included within the system of FIG. 1 according to some embodiments.

As illustrated in FIG. 2, the host server 105 includes an electronic processor 300 (for example, a microprocessor, an application-specific integrated circuit (ASIC), or another suitable electronic device), a memory 305 (for example, a non-transitory, computer-readable medium), and a communication interface 310. The electronic processor 300, the memory 305, and the communication interface 310 communicate wirelessly, over one or more communication lines or buses, or a combination thereof. It should be understood that the host server 105 may include additional components than those illustrated in FIG. 2 in various configurations and may perform additional functionality than the functionality described herein. For example, in some embodiments, the functionality (or a portion thereof) described herein as being performed by the host server 105 may be distributed among servers or devices (including as part of services offered through a cloud service).

The communication interface 310 allows the host server 105 to communicate with devices external to the host server 105. For example, as illustrated in FIG. 1, the host server 105 may communicate with the central queue server 110, the scheduling device 115, the storage device 120, or a combination thereof through the communication interface 310. The communication interface 310 may include a port for receiving a wired connection to an external device (for example, a universal serial bus ("USB") cable and the like), a transceiver for establishing a wireless connection to an external device (for example, over one or more communication networks 125, such as the Internet, local area network ("LAN"), a wide area network ("WAN"), and the like), or a combination thereof.

The electronic processor 300 is configured to access and execute computer-readable instructions ("software") stored in the memory 305. The software may include firmware, one or more applications, program data, filters, rules, one or more program modules, and other executable instructions. For example, the software may include instructions and associated data for performing a set of functions, including the methods described herein.

For example, as illustrated in FIG. 2, the host server 105 hosts one or more virtual machines 320 (referred to herein collectively as "the virtual machines 320" and individually as "a virtual machine 320"). As noted above, the system 100 may include multiple host servers 105. In such embodiments, each host server 105 may host one or more of the virtual machines 320. As described in greater detail below, the virtual machines 320 are configured to execute a job request associated with the entities 225 (for example, process the entities 225) in accordance with the job distribution information 235 stored in the central queue server 110.

In some embodiments, the central queue server 110, the scheduling device 115, the storage device 120, or a combination thereof include substantially similar components to the host server 105 (for example, a communication interface, a memory, and an electronic processor). In other embodiments, the central queue server 110, the scheduling device 115, the storage device 120, or a combination thereof include more or less components than the host server 105. Additionally, in some embodiments, the central queue server 110, the scheduling device 115, the storage device 120, or a combination thereof are combined with the host server 105.

As noted above, when a job request is associated with a large amount of data (for example, the entities 225), a virtual machine 320 may process a subset of the entities 225 associated with the job request and randomly divide any remaining entities into one or more additional subsets and assigned to other virtual machines for processing. However, randomly dividing any remaining entities into additional subsets may result in an uneven distribution of work. An uneven distribution of work may increase a processing time of a job request and decrease the efficiency and utilization of available computing resources. To address these and other problems, embodiments described herein provide methods and systems for self-partitioning such that work is evenly distributed. Additionally, the embodiments described herein provide for a virtual machine 320 that performs job processing as well as job distribution functionality.

Figure 3:
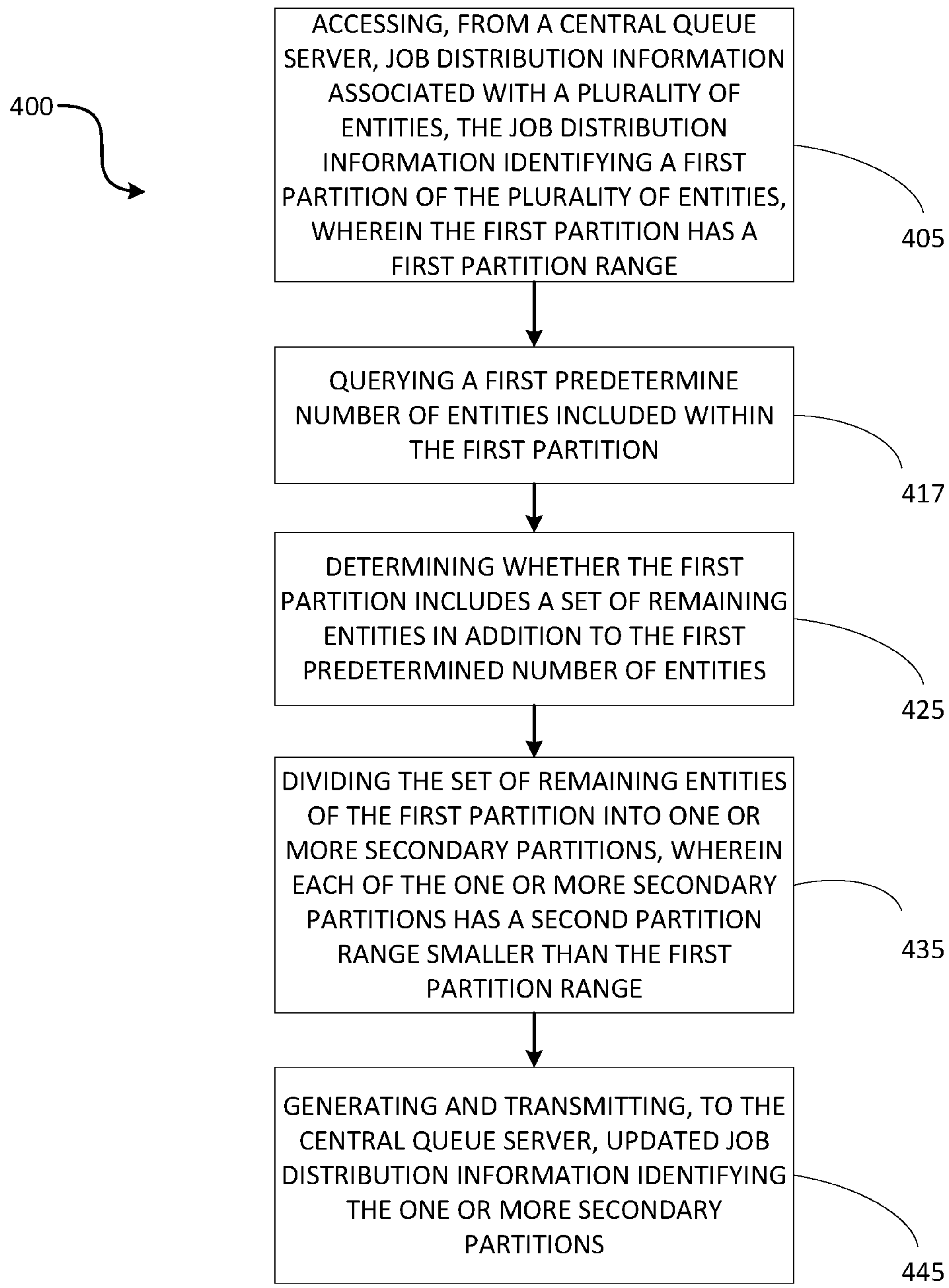
FIG. 3 is a flowchart illustrating a method of self-partitioning using the system of FIG. 1 according to some embodiments.

For example, FIG. 3 is a flowchart illustrating a method 400 for self-partitioning according to some embodiments. The method 400 is described herein as being performed by the host server 105 (the electronic processor 300 executing instructions). However, as noted above, the functionality performed by the host server 105 (or a portion thereof) may be performed by other devices, including, for example, the central queue server 110, the scheduling device 115, the storage device 120, another server hosting one or more virtual machines 320, or a combination thereof (via an electronic processor executing instructions). Additionally, the method 400 is described herein as being performed by the host server 105 on behalf of a virtual machine 320 (for example, a first virtual machine). However, the method 400 may be performed by the host server 105 on behalf of one or more of the virtual machines 320 hosted by the host server 105, such as the first virtual machine, a second virtual machine, a third virtual machine, and the like.

As illustrated in FIG. 3, the method 400 includes accessing, with the electronic processor 300, the job distribution information 235 from the central queue server 110 (at block 405). The electronic processor 300 may access the job distribution information 235 from the central queue server 110 through the network 125.

In some embodiments, the electronic processor 300 continuously monitors the central queue server 110 for the job distribution information 235. The electronic processor 300 may access the job distribution information 235 in response to detecting a receipt of the job distribution information 235 at the central queue server 110. In other words, the electronic processor 300 may monitor the central queue server 110 for a receipt of a job request (including the job distribution information 235 for that job request). In response to detecting the receipt of the job request, the electronic processor 300 may automatically access the job request (the job distribution information 235 for that job request).

Alternatively or in addition, the electronic processor 300 scans or checks the central queue server 110 for the job distribution information 235 on a predetermined frequency or a predetermined scan schedule, such as on a daily basis, an hourly basis, and the like. In response to the electronic processor 300 identifying a presence of the job distribution information 235 during a scan of the central queue server 110, the electronic processor 300 may access the job distribution information 235. Accordingly, in some embodiments, the electronic processor 300 accesses the job distribution information 235 as part of a scan of the central queue server 110 on a predetermined frequency.

Figure 4A:
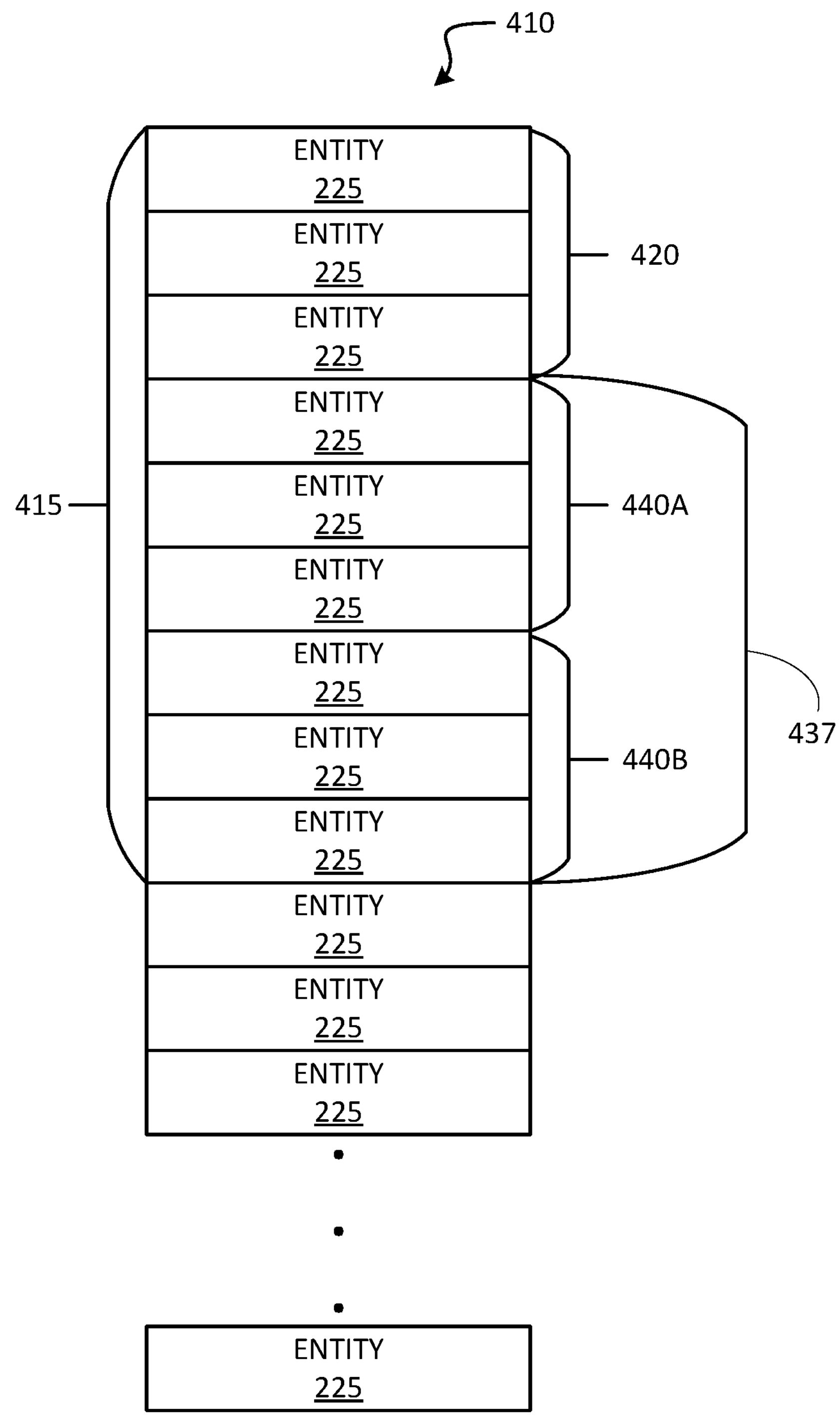
FIGS. 4A-4B schematically illustrate a partitioning of a plurality of entities using the method of FIG. 3 according to some embodiments.

As noted above, the job distribution information 235 may relate to a job request received from the scheduling device 115. For example, the job distribution information 235 may specify a task to be performed for the entities 225 associated with the job request, a partition range (for example, an upper partition bound and a lower partition bound) associated with the job request, a partition key associated with the job request, and the like. Accordingly, in some embodiments, the job distribution information 235 identifies a first partition of the entities 225, where the first partition has a first partition range. The first partition of the entities 225 (and the entities 225 within the first partition) may be identified with a partition key, an upper partition bound, and a lower partition bound. For example, FIG. 4A illustrates a table 410 with a plurality of entities (for example, the entities 225). As seen in FIG. 4A, the table 410 may include a first partition 415. In the illustrated example, the first partition 415 includes nine of the entities 225 stored in the table 410. However, in some embodiments, the first partition 415 includes all of the entities 225 stored in the table 410.

Based on the job distribution information 235, the electronic processor 300 queries a predetermined number of entities included within the first partition (at block 417). The predetermined number of entities may represent a number of entities that a virtual machine 320 may process per job request. For example, in some embodiments, the predetermined number of entities is a fixed amount of entitites corresponding to a basic processing unit, such as a "page" in Microsoft Azure Table Storage. In Microsoft Azure Table Storage, a "page" stores 1000 entities. Accordingly, the predetermined number of entities may be defined based on a storage metric associated with a corresponding table storage service. In some embodiments, the predetermined number of entities includes all of the entities 225 included in the first partition 415. However, in other embodiments, the predetermined number of entities does not include all of the entities 225 included in the first partition 415. For example, as illustrated in FIG. 4A, the predetermined number of entities 420 is a subset of the entities 225 included within the first partition 415.

As illustrated in FIG. 3, the method 400 also includes determining, with the electronic processor 300, whether the first partition 415 includes a set of remaining entities in addition to the predetermined number of entities 420 (at block 425). In the example illustrated in FIG. 4A, the predetermined number of entities 420 did not include all of the entities 225 included in the first partition 415. Accordingly, the first partition 415 includes a set of remaining entities 437 (the entitites 225 not included in the predetermined number of entitites 420). In some embodiments, the electronic processor 300 determines whether the first partition 415 includes the set of remaining entities 437 in addition to the predetermined number of entities 420 (at block 425) while simultaneously querying the predetermined number of entities 420 (at block 417).

In response to determining that the first partition 415 does not include a set of remaining entities 430 in addition to the predetermined number of entities 420, the first virtual machine (for example, the electronic processor 300) may determine that partitioning of the job request is completed because all of the entities 225 associated with the job request have been partitioned. In other words, the first virtual machine determines that there are no remaining entitites to partition.

Alternatively, the electronic processor 300 may determine that the first partition 415 does include a set of remaining entities 430 in addition to the predetermined number of entities 420 (at block 425). In other words, the first virtual machine (for example, the electronic processor 300) may determine that partitioning of the job request is not completed. In response to determining that the first partition 415 includes a set of remaining entities 430, the first virtual machine (for example, the electronic processor 300) divides the set of remaining entities 430 from the first partition 415 into one or more secondary partitions (referred to herein collectively as "the secondary partitions" and individually as "a secondary partition") (at block 435). In some embodiments, the electronic processor 300 divides the set of remaining entities 430 into a certain number of secondary partitions depending on a number of virtual machines. For example, when the system 100 includes five virtual machines 320, the electronic processor 300 divides the set of remaining entitites 430 into five secondary partitions.

As illustrated in FIG. 4A, the electronic processor 300 may divide the set of remaining entities 430 into a first secondary partition 440A and a second secondary partition 440B. Each of the secondary partitions includes a partition range (for example, a second partition range) that is smaller than the first partition range, as seen in FIG. 4A. In some embodiments, the electronic processor 300 divides the set of remaining entities 437 such that each of the secondary partitions have the same second partition range (includes an equal number of the entities 225), as illustrated in FIG. 4A. However, in other embodiments, the electronic processor 300 divides the set of remaining entities 437 such that each of the secondary partitions do not have the same second partition range (does not include an equal number of the entities 225). For example, in some instances, the number of the entities 225 included within the set of remaining entities 430 may not allow for each of the secondary partitions to have the same second partition range.

After dividing the set of remaining entities 430, the electronic processor 300 generates and transmits updated job distribution information identifying the secondary partitions of the set of remaining entities 430 from the first partition 415 (at block 445). The electronic processor 300 may transmit the updated job distribution information to the central queue server 110 through the network 125. In some embodiments, the updated job distribution information includes one or more job requests associated with each of the secondary partitions. In other words, after the updated job distribution information is received by the central queue server 110, the job distribution information 235 will include one or more job requests specific to each of the secondary partitions. For example, when the electronic processor 300 divides the set of remaining entities 437 into two secondary partitions, the updated job distribution information will include two job requests, which are added to a job queue of the central queue server 110.

The electronic processor 300 may receive the predetermined number of entities 420 in response to querying the predetermined number of entities 420. In response to receiving the predetermined number of entities 420, the first virtual machine (for example, the electronic processor 300 executes a job request associated with the plurality of entities 225 for each of the predetermined number of entities 420. In other words, the electronic processor 300 processes each of the entities 225 included in the predetermined number of entities 420. In some embodiments, the electronic processor 300 executes the job request associated with the plurality of entities 225 for each of the predetermined number of entities 420 while simultaneously dividing the set of remaining entities 430 (at step 435). After completing the execution of the job request for each of the predetermined number of entities 420, the first virtual machine (for example, the electronic processor 300) may scan the central queue server 110 for another job request (for example, new job distribution information, updated job distribution information, and the like).

As noted above, the method 400 of FIG. 3 is described herein as being performed by the host server 105 on behalf of a first virtual machine. However, the method 400 may be performed by the host server 105 on behalf of other virtual machines hosted by the host server 105, such as a second virtual machine, a third virtual machine, and the like.

Figure 4B:
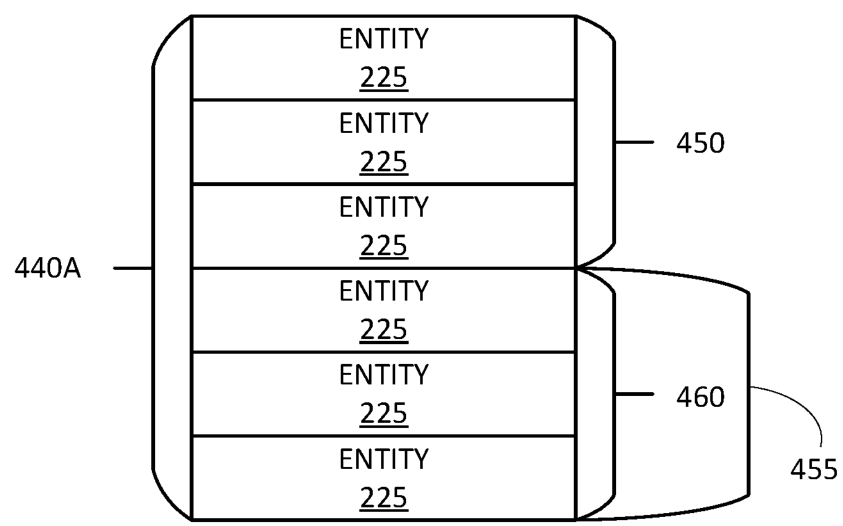

For example, in some embodiments, the electronic processor 300 performs the method 400 with respect to the updated job distribution information on behalf of a second virtual machine. In particular, the electronic processor 300 may access the updated job distribution information. In some embodiments, the second virtual machine (for example, the electronic processor 300) accesses the updated job distribution information in response to the central queue server 110 receiving the updated job distribution information. As noted above, the updated job distribution information identifies the secondary partitions of the set of remaining entities 430 from the first partition 415. Based on the updated job distribution information, the second virtual machine may query a second predetermined number of entities included within the first secondary partition 440A. For example, FIG. 4B illustrates the first secondary partition 440A from FIG. 4A. As seen in FIG. 4B, the second virtual machine queries a second predetermined number of entities 450 included in the first secondary partition 440A.

The second virtual machine also determines whether the first secondary partition 440A includes any remaining entities (for example, a second set of remaining entities) in addition to the second predetermined number of entities 450. When the first secondary partition 440A does not include a second set of remaining entities in addition to the second predetermined number of entities 450, the second virtual machine executes a job request for the second predetermined number of entities 450. However, when the first secondary partition 440A does include a second set of remaining entities in addition to the second predetermined number of entities 450, the second virtual machine partitions the entities 225 included in the second set of remaining entities. In the illustrated example of FIG. 4B, the first secondary partition 440A includes a second set of remaining entities 455. Accordingly, the second virtual machine partitions the set of remaining entities 455 by dividing the second set of remaining entities 455 of the first secondary partition 440A into a third partition 460. The third partition has a partition range (for example, a third partition range) smaller than the second partition range. As illustrated, the third partition 460 includes all of the entities 225 included in the second set of remaining entitites 455. However, in some embodiments, the third partition 460 includes a different amount of entitites 225 included in the second set of remaining entitites 455. After dividing the second set of remaining entities 455, the second virtual machine generates and transmits, to the central queue server 110, additional updated job distribution information identifying the third partition 460 of the second set of remaining entities 455 from the first secondary partition 440A.

In some embodiments, the method 400 is performed by the host server 105 on behalf of one or more of the virtual machines 320 hosted by the host server 105 simultaneously (for example, in parallel). For example, the electronic processor 300 may perform the method 400 with respect to the first secondary partition 440A on behalf of the second virtual machine while executing the job request for the predetermined set of entities 420 on behalf of the first virtual machine. Alternatively or in addition, the electronic processor 300 may perform the method 400 with respect to the second secondary partition 440B on behalf of a third virtual machine while performing the method 400 with respect to the first secondary partition 440A on behalf of the second virtual machine. Alternatively or in addition, the electronic processor 300 performs the method 400 with respect to a first job request on behalf of the first virtual machine while performing the method 400 with respect to a second job request on behalf of the second virtual machine. The first job request and the second job request may be unrelated (originate from different original job requests initiated at the scheduling device 115). However, in other embodiments, the first job request and the second job request are related (originate from the same original job request initiated at the scheduling device 115). For example, as noted above, the electronic processor 300 may perform the method 400 with respect to the second secondary partition 440B on behalf of a third virtual machine (a first job request) while performing the method 400 with respect to the first secondary partition 440A on behalf of the second virtual machine (a second job request).

Accordingly, the embodiments described herein provide, among other things, methods and systems for self-partitioning such that work is evenly distributed across virtual machines. The embodiments described herein, among other things, improve and optimize the utilization of computing resources. For example, by evenly distributing work across virtual machines, computing resources are more evenly balanced and, ultimately, are more fully and efficiently utilized. By utilizing the computing resources more fully, job requests may be processed more quickly. In other words, by evenly distributing work across virtual machines embodiments described herein may process stored data as fast as permitted by the computing resources available. Additionally, the embodiments described herein provide for virtual machines that perform job processing and job distribution functionality as opposed to a centralized process for dividing work among virtual machines that may result in bottlenecks and slowness. Various features and advantages of some embodiments are set forth in the following claims.

What is claimed is:

1. A system of self-partitioning entities, the system comprising:

an electronic processor configured to access, from a central queue server, job distribution information associated with a plurality of entities, the job distribution information identifying a first partition of the plurality of entities, wherein the first partition has a first partition range, query a first predetermined number of entities included within the first partition, determine whether the first partition includes a set of remaining entities in addition to the first predetermined number of entities, and in response to the first partition including a set of remaining entities, divide the set of remaining entities from the first partition into one or more secondary partitions, wherein each of the one or more secondary partitions has a second partition range smaller than the first partition range, and generate and transmit, to the central queue server, updated job distribution information identifying the one or more secondary partitions, access the updated job distribution information, query a second predetermined number of entities included within a first secondary partition of the one or more secondary partitions, determine whether the first secondary partition includes a second set of remaining entities in addition to the second predetermined number of entities, and in response to the first secondary partition including a second set of remaining entities, divide the second set of remaining entities of the first secondary partition into a third partition, wherein the third partition has a third partition range smaller than the second partition range, and generate and transmit, to the central queue server, additional updated job distribution information identifying the third partition.

2. The system of claim 1, wherein the electronic processor is configured to continuously monitor the central queue server for the job distribution information and access the job distribution information in response to detecting a receipt of the job distribution information at the central queue server.

3. The system of claim 1, wherein the electronic processor is configured to access the job distribution information as part of a scan of the central queue server on a predetermined frequency.

4. The system of claim 1, wherein the electronic processor is configured to access the updated job distribution information in response to the central queue server receiving the updated job distribution information.

5. The system of claim 1, wherein the electronic processor is configured to access the job distribution information for a first virtual machine and access the updated job distribution information for a second virtual machine.

6. The system of claim 1, wherein the updated job distribution information identifies the first secondary partition of the one or more secondary partitions and the second secondary partition of the one or more secondary partitions.

7. The system of claim 6, wherein the electronic processor is further configured to query a third predetermined number of entities included within the second secondary partition, execute a second job request associated with the plurality of entities for the second predetermined number of entities, and execute a third job request associated with the plurality of entities for the third predetermined number of entities.

8. The system of claim 7, wherein the electronic processor is configured to execute the second job request in parallel with the third job request.

9. The system of claim 7, wherein the electronic processor is configured to query the second predetermined number of entities and execute the second job request for a second virtual machine and wherein the electronic processor is configured to query the third predetermined number of entities and execute the third job request for a third virtual machine.

10. A method of self-partitioning entities, the method comprising:

accessing, with an electronic processor, from a central queue server, job distribution information associated with a plurality of entities, the job distribution information identifying a first partition of the plurality of entities, wherein the first partition has a first partition range, querying, with the electronic processor, a first predetermined number of entities included within the first partition, determining, with the electronic processor, whether the first partition includes a set of remaining entities in addition to the first predetermined number of entities, and in response to the first partition including a set of remaining entities, dividing, with the electronic processor, the set of remaining entities from the first partition into one or more secondary partitions, wherein each of the one or more secondary partitions has a second partition range smaller than the first partition range, and generating and transmitting, with the electronic processor, to the central queue server, updated job distribution information identifying the one or more secondary partitions, accessing the updated job distribution information, querying a second predetermined number of entities included within a first secondary partition of the one or more secondary partitions, determining whether the first secondary partition includes a second set of remaining entities in addition to the second predetermined number of entities, and in response to the first secondary partition including a second set of remaining entities, dividing the second set of remaining entities of the first secondary partition into a third partition, wherein the third partition has a third partition range smaller than the second partition range, and generating and transmitting, to the central queue server, additional updated job distribution information identifying the third partition.

11. The method of claim 10, further comprising:

receiving the first predetermined number of entities; and in response to receiving the first predetermined number of entities, executing a first job request associated with the plurality of entities for each of the first predetermined number of entities.

12. The method of claim 10, further comprising:

continuously monitoring the central queue server for the job distribution information, wherein accessing the job distribution information includes accessing the job distribution information in response to detecting a receipt of the job distribution information at the central server.

13. The method of claim 10, wherein accessing the job distribution information includes accessing the job distribution information as part of a scan of the central queue server on a predetermined frequency.

14. The method of claim 10, wherein accessing the job distribution information includes accessing the job distribution information for a first virtual machine.

15. The method of claim 10, further comprising:

querying a third predetermined number of entities included within a second secondary partition included in the one or more secondary partitions, executing a second job request associated with the plurality of entities for the second predetermined number of entities, and executing a third job request associated with the plurality of entities for the third predetermined number of entities.

16. The method of claim 15, wherein executing the second job request and executing the third job request includes executing the second job request in parallel with the execution of the third job request.

17. A non-transitory, computer-readable medium including instructions, that when executed by an electronic processor, perform a set of functions, the set of functions comprising:

accessing, from a central queue server, job distribution information associated with a plurality of entities, the job distribution information identifying a first partition of the plurality of entities, wherein the first partition has a first partition range, querying a first predetermined number of entities included within the first partition, determining whether the first partition includes a set of remaining entities in addition to the first predetermined number of entities, and in response to the first partition including a set of remaining entities, dividing the set of remaining entities from the first partition into one or more secondary partitions, wherein each of the one or more secondary partitions has a second partition range smaller than the first partition range, and generating and transmitting, to the central queue server, updated job distribution information identifying the one or more secondary partitions accessing the updated job distribution information, querying a second predetermined number of entities included within a first secondary partition of the one or more secondary partitions, determining whether the first secondary partition includes a second set of remaining entities in addition to the second predetermined number of entities, and in response to the first secondary partition including a second set of remaining entities, dividing the second set of remaining entities of the first secondary partition into a third partition, wherein the third partition has a third partition range smaller than the second partition range, and generating and transmitting, to the central queue server, additional updated job distribution information identifying the third partition.

18. The non-transitory, computer-readable medium of claim 17, wherein the set of functions further comprises:

receiving the first predetermined number of entities; and in response to receiving the first predetermined number of entities, executing a first job request associated with the plurality of entities for each of the first predetermined number of entities.

19. The non-transitory, computer-readable medium of claim 18, wherein the set of functions further comprises:

after completing the execution of the first job request for each of the first predetermined number of entities, scanning the central queue server for new job distribution information.

* * * * *